(12) United States Patent
Ohnuma

(10) Patent No.: US 7,546,626 B2
(45) Date of Patent: Jun. 9, 2009

(54) INFORMATION PROVIDING SYSTEM, INFORMATION PROCESSING APPARATUS, AND METHOD

(75) Inventor: Kensuke Ohnuma, Tokyo (JP)

(73) Assignee: Sony Corporation (JP)

( * ) Notice: Subject to any disclaimer, the term of this patent is extended or adjusted under 35 U.S.C. 154(b) by 948 days.

(21) Appl. No.: 10/484,542

(22) PCT Filed: Jul. 24, 2002

(86) PCT No.: PCT/JP02/07467

§ 371 (c)(1),
(2), (4) Date: Aug. 12, 2004

(87) PCT Pub. No.: WO03/010906

PCT Pub. Date: Feb. 6, 2003

(65) Prior Publication Data

US 2004/0260725 A1 Dec. 23, 2004

(30) Foreign Application Priority Data

Jul. 24, 2001 (JP) .............................. 2001-223164

(51) Int. Cl.
*H04N 7/16* (2006.01)
*H04N 7/173* (2006.01)
*H04N 5/445* (2006.01)
*H04N 5/91* (2006.01)
*G06F 3/00* (2006.01)
*G06F 13/00* (2006.01)

(52) U.S. Cl. ................ 725/136; 725/100; 725/134; 725/142; 725/115; 725/40; 386/83

(58) Field of Classification Search ................ 725/100, 725/134, 142, 151, 115, 136, 40, 48, 51, 725/54; 386/83
See application file for complete search history.

(56) References Cited

U.S. PATENT DOCUMENTS

| 6,201,924 | B1 * | 3/2001 | Crane et al. | ............... | 386/52 |
| 6,567,980 | B1 * | 5/2003 | Jain et al. | ............... | 725/61 |
| 6,757,482 | B1 * | 6/2004 | Ochiai et al. | ............... | 386/83 |
| 7,284,032 | B2 * | 10/2007 | Weber | ............... | 709/204 |
| 2001/0031066 | A1 * | 10/2001 | Meyer et al. | ............... | 382/100 |
| 2005/0123268 | A1 * | 6/2005 | Kawaguchi et al. | ........... | 386/46 |

FOREIGN PATENT DOCUMENTS

| EP | 1 003 304 A1 | 5/2000 |
| JP | 2000-4272 A1 | 1/2000 |
| JP | 2001-24611 A1 | 1/2001 |
| JP | 2001-168684 A1 | 6/2001 |
| WO | WO-99/59290 A1 | 11/1999 |

* cited by examiner

*Primary Examiner*—Joseph G Ustaris
(74) *Attorney, Agent, or Firm*—Lerner, David, Littenberg, Krumholz & Mentlik, LLP

(57) ABSTRACT

A data providing system is capable of providing metadata or supplementary data generated in a predetermined area to a different area. Metadata related to broadcast programs are transmitted from a first broadcast receiver/recorder to a server via a network. The server registers the metadata transmitted from the first broadcast receiver/recorder in its program database, specifies a broadcast program on the basis of data for specifying the broadcast program transmitted from a second broadcast receiver/recorder, retrieves the metadata related to the specified broadcast program, and transmits the retrieved metadata to the second broadcast receiver/recorder, whereby the metadata are distributed from the server to the second broadcast receiver/recorder via the network.

5 Claims, 20 Drawing Sheets

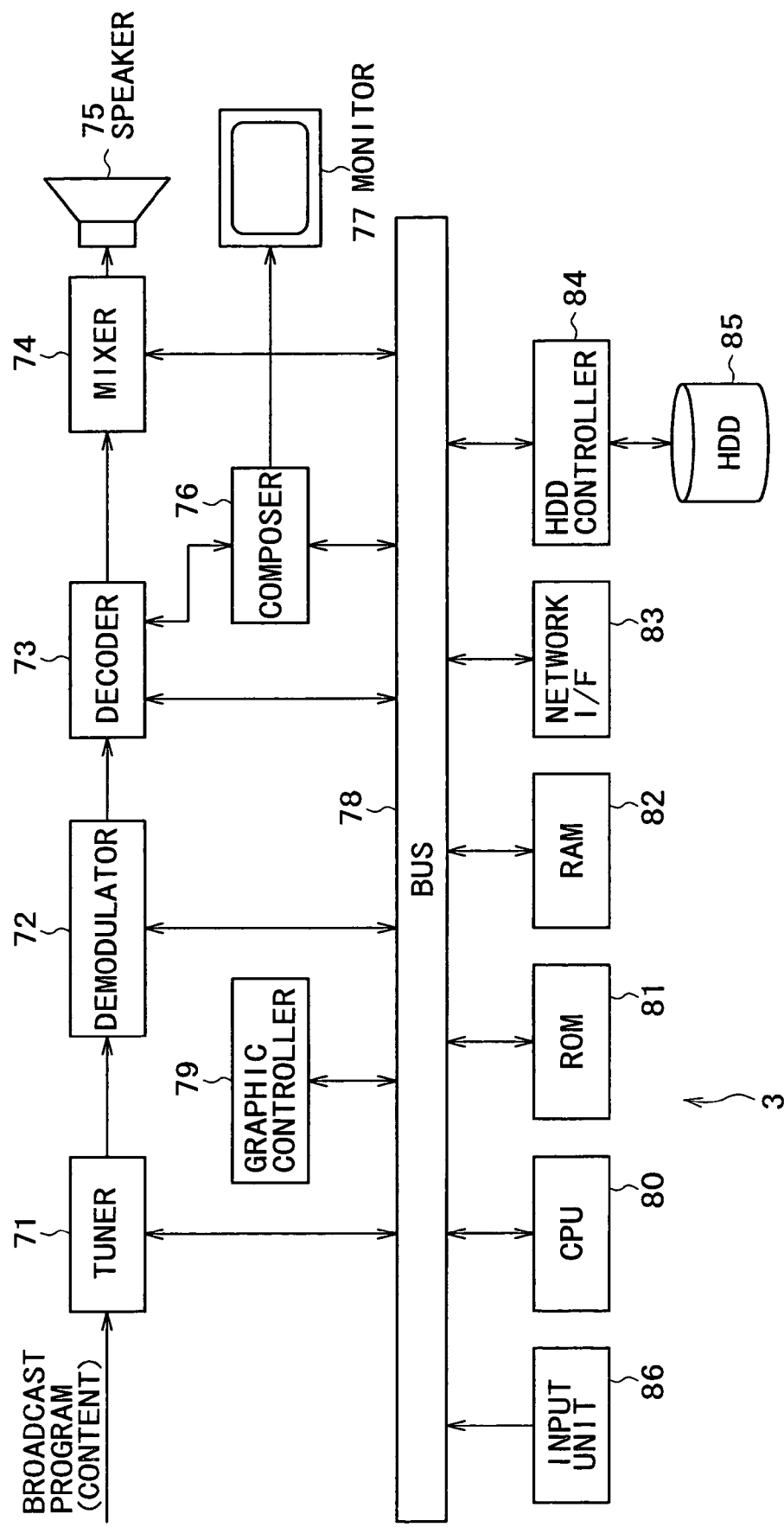

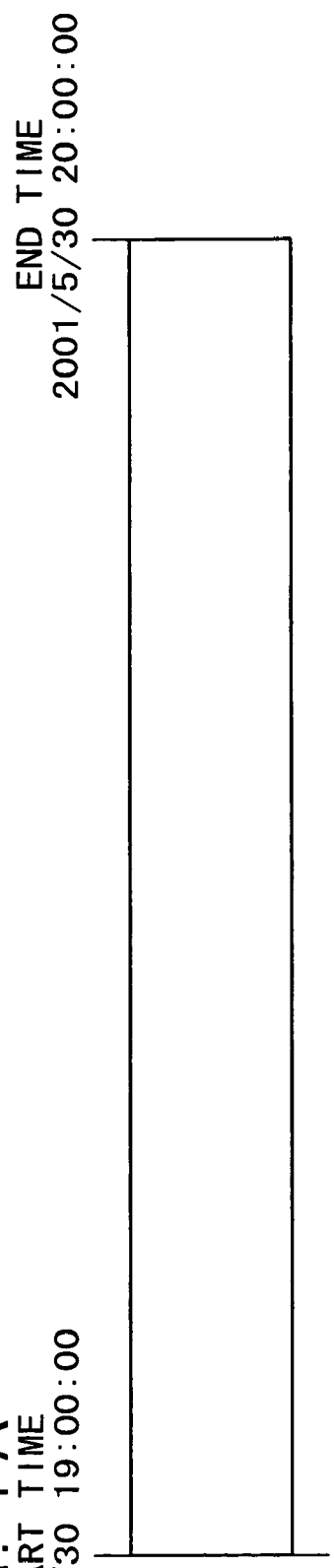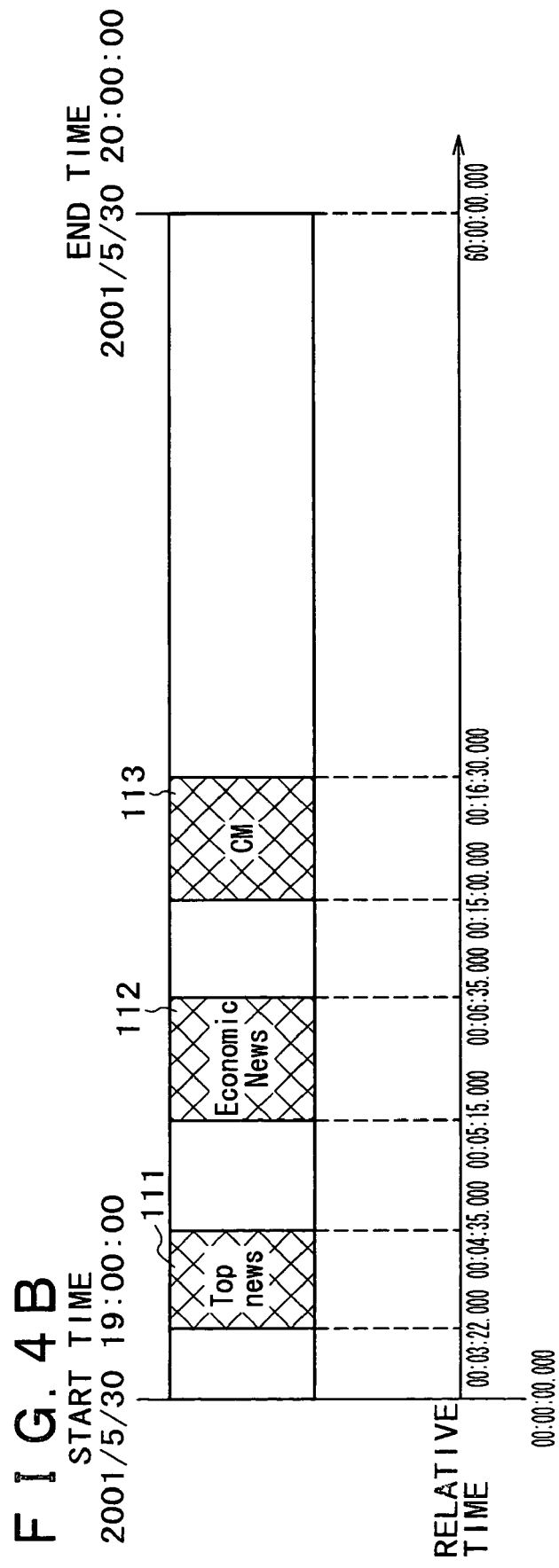

F I G. 5

```
<ProgramIndex>
  <Target>
    <Area id="Tokyo">
    <Channel network="Terrestrial">4</Channel>
    <StartTime>2001-05-30T19:00:00.0+09:00</StartTime>
    <EndTime>2001-05-30T20:00:00.0+09:00</EndTime>
  </Target>
  <Index>
    <Marker>
      <Position>00:05:15.000</Position>
      <Description>Economic news</Description>
    </Marker>
  </Index>
  <Story title="News digest">
    <Segment seq="1">
      <StartPosition>00:03:22.000</StartPosition>
      <EndPosition>00:04:35.000</EndPosition>
      <Description>Top news</Description>
    </Segment>
    <Segment=seq"2">
      <StartPosition>00:05:15.000</StartPosition>
      <EndPosition>00:06:35.000</EndPosition>>
      <Description>Economic news</Description>
    <Segment>
  </Story>
</ProgramIndex>
```

- 201: SPECIFICATION OF TARGET PROGRAM
- 202: MARKER DATA
- 203: STORY DATA

FIG. 7

| CUSTOMER ID | AREA | CUSTOMER TYPE | USER NAME | PASSWORD |
|---|---|---|---|---|
| 1 | Tokyo | 1 | xxx | yyy |
| 2 | Niijima | 3 | foo | bar |
| 3 | Osaka | 2 | hoge | hoge |
| 4 | Kashiwabara | 1 | hero | hero |
| 5 | Nagoya | 2 | aaa | bbb |

401

F I G. 8

| CUSTOMER TYPE ID | EXPLANATION |
|---|---|
| 1 | TERRESTRIAL ONLY |
| 2 | TERRESTRIAL AND BS ANALOG |
| 3 | TERRESTRIAL, BS-ANALOG, BS-DIGITAL AND CS |

402

F I G. 9

| CUSTOMER TYPE ID | BROADCAST PLATFROM ID |
|---|---|
| 1 | Terrestrial |
| 2 | Terrestrial |
| 2 | BS-analog |
| 3 | Terrestrial |
| 3 | BS-analog |
| 3 | BSvdigital |
| 3 | CS |

| ARER ID | BROADCAST PLATFORM ID | BROADCAST STATION ID | CHANNEL No. |
|---|---|---|---|
| Tokyo | Terrestrial | JOAK | 1 |
| Niijima | Terrestrial | JOAK | 52 |
| Osaka | Terrestrial | JOBK | 2 |
| Kashiwabara | Terrestrial | JOBK | 52 |
| Tokyo | Terrestrial | JOAX | 4 |
| Niijima | Terrestrial | JOAX | 54 |
| Osaka | Terrestrial | JOIX | 10 |
| Kashiwabara | Terrestrial | JOBK | 60 |
| Nagoya | Terrestrial | JOCH | 35 |
| Tokyo | Terrestrial | JOCX | 8 |
| Niijima | Terrestrial | JOCX | 58 |
| Osaka | Terrestrial | JODX | 8 |
| Kashiwabara | Terrestrial | JODX | 58 |
| Tokyo | BS-analog | JO22-BS | 11 |
| Osaka | BS-analog | JO22-BS | 11 |
| Fukuoka | BS-analog | JO22-BS | 11 |
| Sapporo | BS-analog | JO22-BS | 11 |
| Nagoya | BS-analog | JO22-BS | 11 |
| Tokyo | BS-analog | JO241-BS-HD | 7 |
| Osaka | BS-analog | JO241-BS-HD | 7 |
| Fukuoka | BS-analog | JO241-BS-HD | 7 |
| Sapporo | BS-analog | JO241-BS-HD | 7 |
| Nagoya | BS-analog | JO241-BS-HD | 7 |

406

F I G. 1 3

| BROADCAST STATION ID | BROADCAST STATION NAME |
|---|---|
| JOAK | NHK GENERAL (TOKYO) |
| JOBK | NHK GENERAL (OSAKA) |
| JOAX | NIHON TV |
| JOIX | YOMIURI TV |
| JOCH | CHUKYO TV |
| JOCX | FUJI TV |
| JODX | KANSAI TV |
| JO22-BS | NHK BS 2 |
| JO241-BS-HD | NHK HIGH-VISION |

| COMPILATION ID | BROADCAST STATION ID | PROGRAM ID | START TIME | END TIME |
|---|---|---|---|---|
| 1 | JOAK | 1 | 984999600000 | 984997800000 |
| 2 | JOBK | 1 | 984999600000 | 984997800000 |
| 6 | J022-BS | 1 | 984999600000 | 984997800000 |
| 7 | J0241-BS-HD | 1 | 984999600000 | 984997800000 |
| 8 | JOAX | 2 | 984923760000 | 984925560000 |
| 9 | JOIX | 2 | 985449000000 | 985450800000 |
| 13 | JOAX | 3 | 985071600000 | 985076700000 |
| 14 | JOCH | 3 | 985071600000 | 985076700000 |
| 15 | JOCX | 4 | 984999600000 | 985002840000 |
| 16 | JODX | 4 | 984999600000 | 985002840000 |
| 20 | JOAK | 5 | 984988800000 | 984992400000 |
| 21 | JOBK | 5 | 984988800000 | 984992400000 |

| PROGRAM ID | TITLE | EXPLANATION | GENRE | METADATA |
|---|---|---|---|---|
| 1 | TODAY'S NEWS | RESIGNATION OF CABINET | NEWS | info1.xml |
| 2 | COMEDY THEATER | LIVE FROM OO THEATER | VARIETY | info2.xml |
| 3 | PRO BASEBALL | EDO DAME | SPORTS | info3.xml |
| 4 | POP ROOM | WITH VARIEGATED GUESTS | MUSIC | info4.xml |
| 5 | SUMO WRESTLING | 9TH DAY | SPORTS | info5.xml |

409

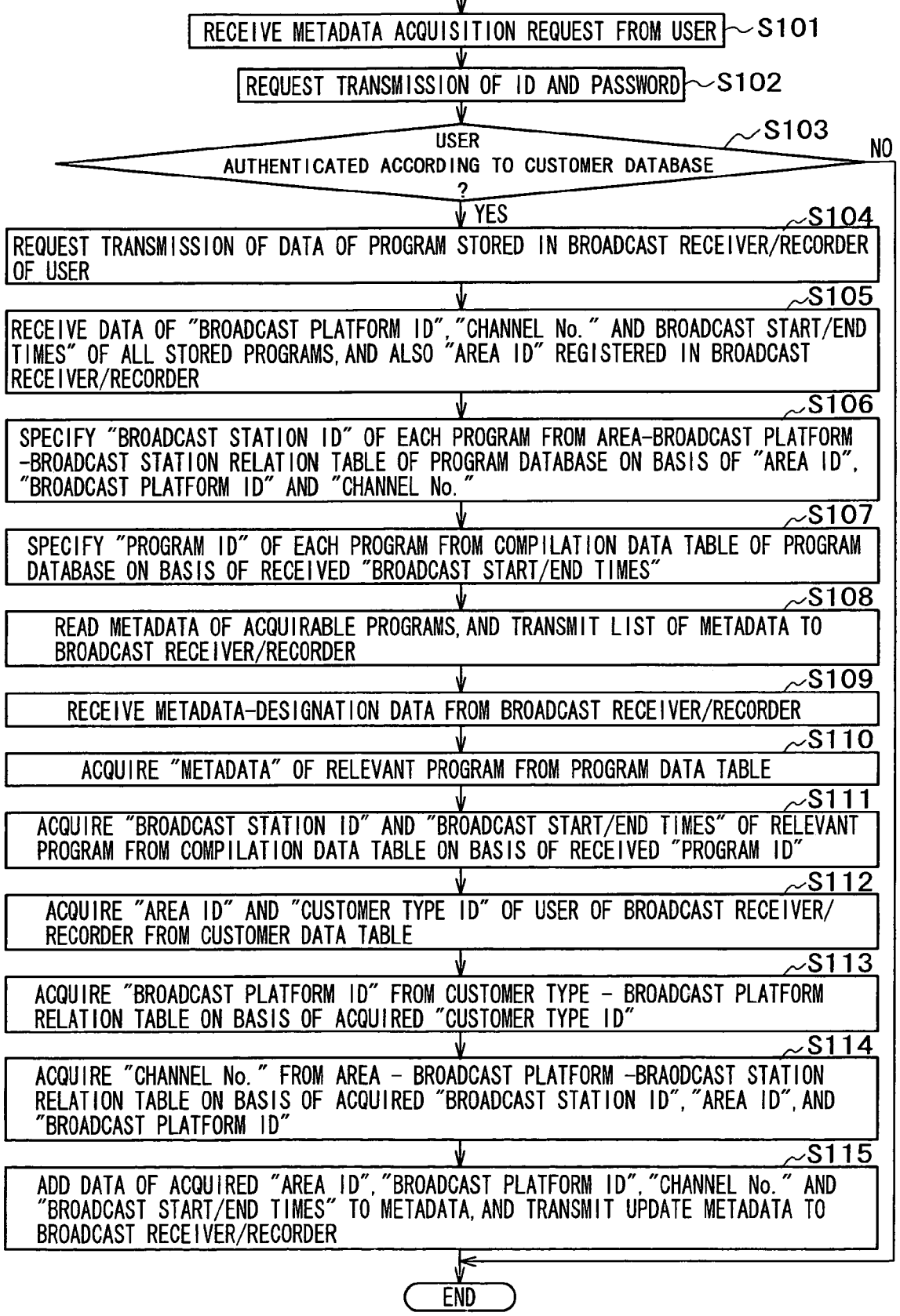

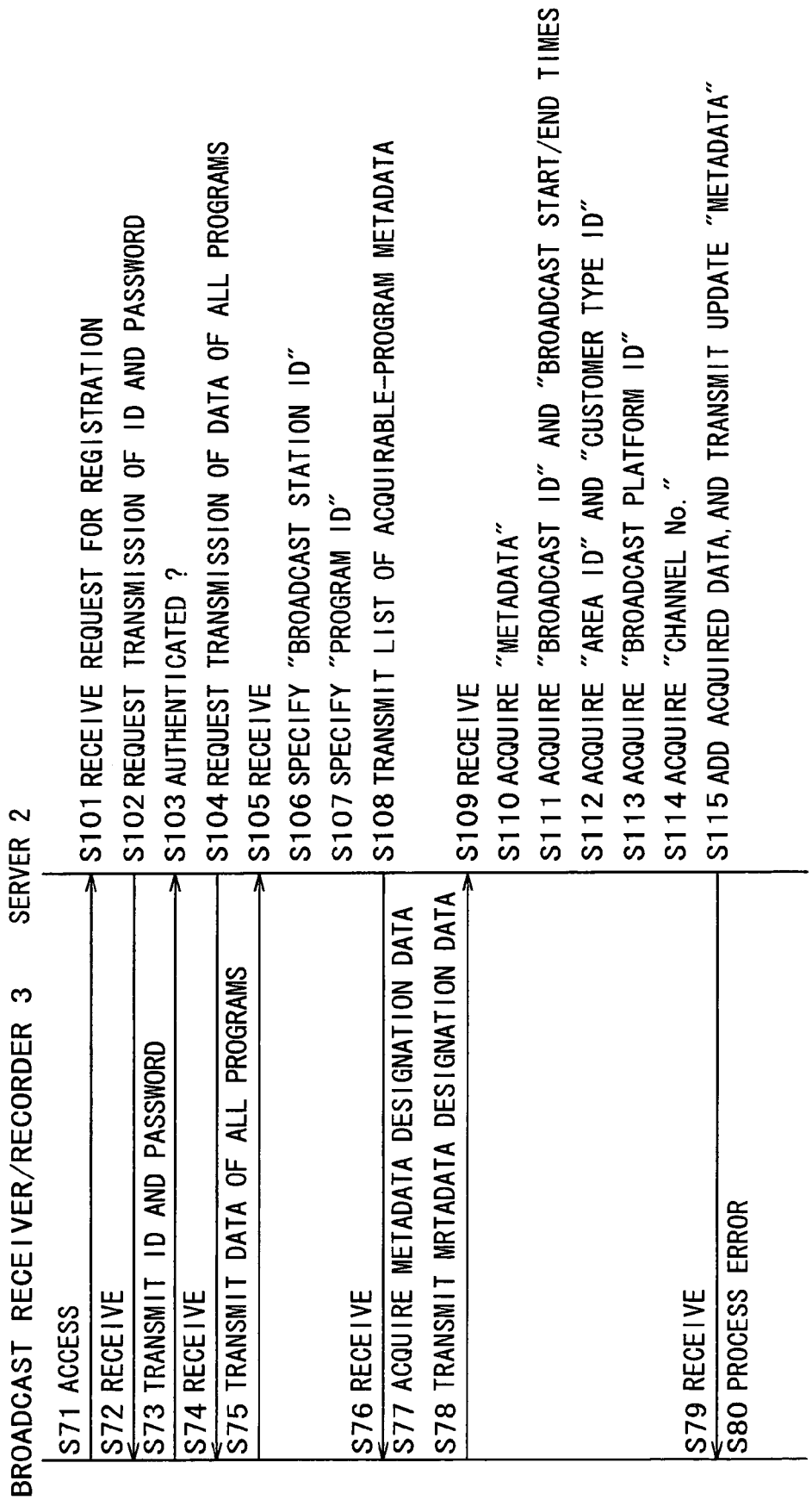

INFORMATION PROVIDING SYSTEM, INFORMATION PROCESSING APPARATUS, AND METHOD

BACKGROUND OF THE INVENTION

The present invention relates to a data providing system and a data processing apparatus and method, and more particularly to those adapted for providing metadata (supplementary data) of a broadcast program generated in a predetermined area to a different area.

There recently has been proposed secondary utilization of a broadcast program (broadcast content) realized by selectively reproducing only predetermined scenes out of the broadcast program (broadcast content) recorded by a viewer. Normally, such reproduction is performed on the basis of metadata. In the metadata, there are described the subject or target broadcast program (broadcast content) and the positions of reproduction thereof.

In most cases, the metadata are distributed to viewers through the Internet. In such a case, the viewer accesses a predetermined server through the Internet, then specifies a desired broadcast program (broadcast content), and receives distribution of the corresponding metadata. Specifying the broadcast program (broadcast content) is performed in accordance with the relevant broadcast station and the broadcast area concerned. However, when the broadcast program (broadcast content) is to be specified in accordance with the broadcast station and the area, there arises a problem that, in case the same broadcast program (broadcast content) is broadcast from different stations, it becomes difficult to recognize that the broadcast programs (broadcast contents) transmitted from the individual broadcast stations are the same broadcast program (broadcast content) (consequently, the same metadata are applicable).

In view of the above problem, there is proposed another technique of multiplexing an identifier, which specifies the relevant program, in transmission of the video images. However, another problem arises in regard to the point that such a system is not constructible with ease since an identifier needs to be produced and multiplexed in each broadcast station.

SUMMARY OF THE INVENTION

It is an object of the present invention to realize that metadata, which are related to a broadcast program created in a predetermined area, can be provided to a different area as well.

A data providing system of the present invention includes first, second and third data processors connected to a network; the first data processor being operable to transmit metadata related to broadcast programs to the second data processor via the network; the second data processor being operable to acquire from the transmitted metadata data for each of the broadcast programs specifying a broadcast station of the broadcast program and time data related to the broadcast program, to retrieve a program ID for identifying the broadcast program based on the data specifying the broadcast station and the time data, and to register the metadata related to the broadcast program in relation to the retrieved program ID; the third data processor being operable to transmit selected data to the second data processor via the network, the selected data including data for specifying the broadcast station of a broadcast program received and recorded in the third data processor and time data related to the received and recorded broadcast program. The second data processor is further operable to specify the program ID of the received and recorded broadcast program based on the selected data, to convert the metadata corresponding to the specified program ID based on the selected data, and to transmit the converted metadata to the third data processor via the network; and the third data processor being further operable to receive the converted metadata from the second data processor via the network.

A data processing apparatus of the present invention includes receiving means for receiving metadata related to broadcast programs, the metadata being transmitted from a first other data processor via a network; acquiring means for acquiring from the received metadata data for each of the broadcast programs specifying a broadcast station of the broadcast program and time data related to the broadcast program; retrieval means for retrieving a program ID for identifying the broadcast program based on the data specifying the broadcast station and the time data; and register means for registering the metadata related to the broadcast program in relation to the retrieved program ID.

The data processing apparatus may further include accepting means for accepting selected data from a second other data processor via the network, the selected data including data for specifying a broadcast station of a broadcast program received and recorded in the second other data processor and time data related to the received and recorded broadcast program; specifying means for specifying the program ID of the received and recorded broadcast program based on the selected data; conversion means for converting the metadata corresponding to the specified program ID based on the selected data; and transmitting means for transmitting the converted metadata to the second other data processor via the network.

Each of a data processing method and a program recorded in a recording medium for processing data according to the present invention include receiving metadata related to broadcast programs, the metadata being transmitted from a first other data processor via a network; acquiring from the received metadata data for each of the broadcast programs specifying a broadcast station of the broadcast program and time data related to the broadcast program; retrieving a program ID for identifying the broadcast program based on the data specifying the broadcast station and the time data; and registering the metadata related to the broadcast program in relation to the retrieved program ID.

A system for processing data according to the present invention includes a processor operable to execute instructions; and instructions, the instructions including receiving metadata related to broadcast programs, the metadata being transmitted from a first other data processor via a network; acquiring from the received metadata data for each of the broadcast programs specifying a broadcast station of the broadcast program and time data related to the broadcast program; retrieving a program ID for identifying the broadcast program based on the data specifying the broadcast station and the time data; and registering metadata related to the broadcast program in relation to the retrieved program ID.

In the data providing system of the present invention, the metadata related to broadcast programs are transmitted from the first data processor to the second data processor via the network. In the second data processor, data for each of the broadcast programs is acquired from the transmitted metadata, the data specifying the broadcast station of the broadcast program and time data related to the broadcast program. Then, the program ID for identifying the broadcast program is retrieved based on the data specifying the broadcast station and the time data, and the metadata related to the broadcast program is registered in relation to the retrieved program ID.

Selected data including data for specifying the broadcast station of a broadcast program received and recorded in the third data processor and time data related to the received and recorded broadcast program are transmitted from the third data processor to the second data processor via the network. In the second data processor, the program ID of the received and recorded broadcast program is specified based on the selected data, the metadata corresponding to the specified program ID is converted based on the selected data, and the converted metadata are transmitted to the third data processor via the network. The converted metadata transmitted by the second data processor is received by the third data processor via the network.

In the data processing apparatus and method, the recording medium, and the system for processing data according to the present invention, metadata related to broadcast programs and transmitted from the first other data processor are received via the network; data for each of the broadcast programs specifying the broadcast station of the broadcast program and time data related to the broadcast program are acquired from the received metadata; the program ID for identifying the broadcast program is retrieved based on the data specifying the broadcast station and the time data; and the metadata related to the broadcast program is registered in relation to the retrieved program ID.

According to the data processing apparatus and method, the recording medium and the data processing system of the present invention, the metadata of broadcast programs received from the other data processor via the network are registered, then a broadcast program in a different area is specified, and the metadata corresponding to the specified broadcast program are retrieved.

BRIEF DESCRIPTION OF THE DRAWINGS

FIG. 3 is a block diagram showing the structure of a broadcast receiver/recorder in FIG. 1;

FIGS. 4A and 4B are diagrams showing the composition of a broadcast program;

FIG. 5 is a diagram showing an example of additional data;

FIG. 7 is a diagram showing a customer data table of the database in the server of FIG. 6;

FIG. 8 is a diagram showing a customer type data table of the database in the server of FIG. 6;

FIG. 9 is a diagram showing a table of the relationship between customer types and broadcast platforms of the database in the server of FIG. 6;

FIG. 12 is a diagram showing a table of the relationship among areas, broadcast platforms, and broadcast stations of the database in the server of FIG. 6;

FIG. 13 is a diagram showing a broadcast station data table of the database in the server of FIG. 6;

FIG. 14 is a diagram showing a compilation data table of the database in the server of FIG. 6;

FIG. 15 is a diagram showing a program data table of the database in the server of FIG. 6;

FIG. 21 is a flowchart for explaining a processing routine to transmit the metadata from the server in FIG. 1; and FIG. 22 is a diagram for explaining the relationship between the processing routines of FIGS. 20 and 21.

DETAILED DESCRIPTION

Figure 1:
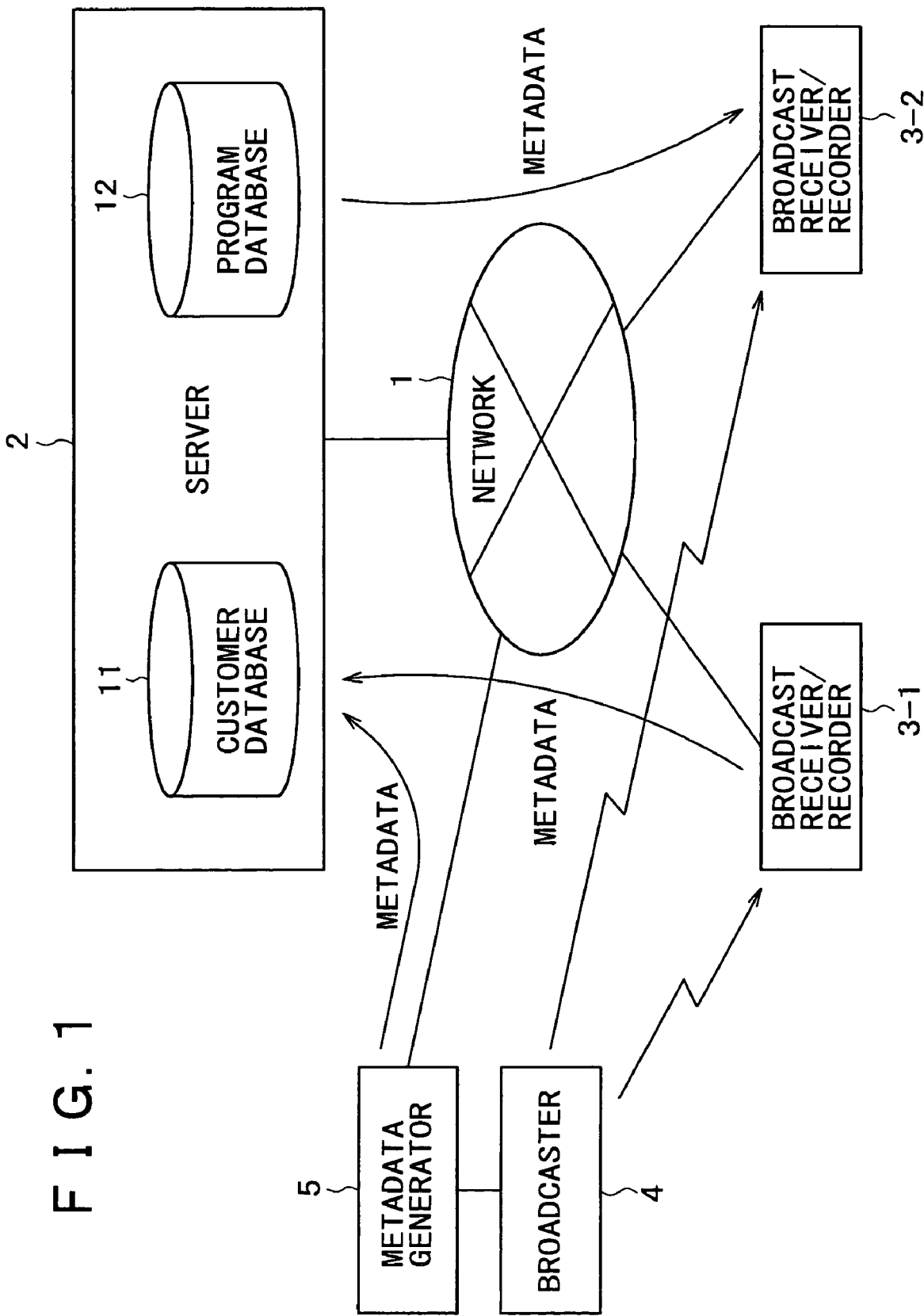
FIG. 1 is a block diagram showing the structure of a data providing system where the present invention is applied.

FIG. 1 shows a structural example of a data providing system where the present invention is applied. In this structural example, a server 2 and broadcast receivers/recorders 3-1 and 3-2 are connected to a network 1 represented by the Internet. In this example, the server 2 is numerically one and the broadcast receivers/recorders 3-1 and 3-2 are numerically two, but any desired number of such component devices or apparatus may be connected.

Each of the broadcast receivers/recorders 3-1 and 3-2 has functions of receiving a broadcast program (broadcast content) transmitted from a broadcaster 4 and recording the received program. A metadata generator 5 generates metadata (supplementary data) related to the broadcast program transmitted from the broadcaster 4, and supplies the metadata via the network 1 to the server 2, which stores the metadata therein.

The server 2 also receives, via the network 1, other metadata generated by the users of the broadcast receivers/recorders 3-1 and 3-2 on the basis of the received program, and transmits such metadata via the network 1.

The server 2 has a customer database 11 and a program database 12 therein, and stores, in the database 12, the metadata transmitted thereto via the network 1. In the customer database 11, data concerning the manager of the broadcaster 4 (metadata generator 5) or the users of the broadcast receivers/recorders 3-1 and 3-2 are registered previously. That is, the data required for authentication are registered previously in the customer database 11 of the server 2. In this data providing system, the metadata are distributed via the network 1.

Figure 2:
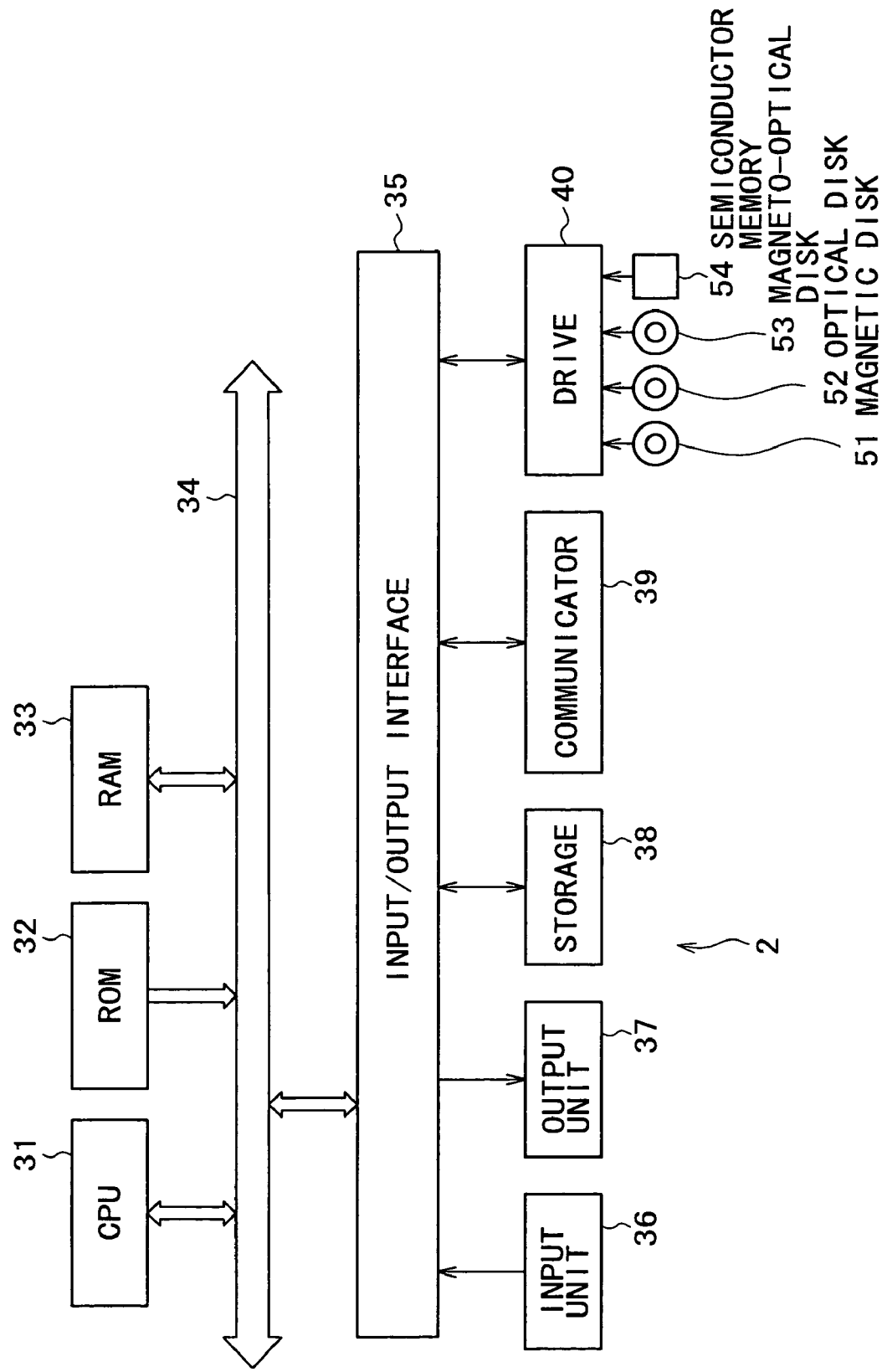
FIG. 2 is a block diagram showing a structural example of a server included in FIG. 1.

FIG. 2 shows a structural example of the server 2. In FIG. 2, a CPU (Central Processing Unit) 31 executes various processes in accordance with a program stored in a ROM (Read Only Memory) 32 or a program loaded from a storage 38 into a RAM (Random Access Memory) 33. In the RAM 33, there are also stored some more data required for the CPU 31 to execute various processes.

The CPU 31, ROM 32, and RAM 33 are connected to one another via a bus 34, and an input-output interface 35 is also connected to the bus 34.

To the input-output interface 35, there are connected an input unit 36 including a keyboard, a mouse, and so forth; an output unit 37 including a display with a CRT (Cathode Ray Tube), an LCD (Liquid Crystal Display), or the like, and a speaker; a storage 38 including a hard disk and so forth; and a communicator 39 including a modem, a terminal adaptor, and so forth. The communicator 39 performs communications via the network 1 inclusive of the Internet.

A drive 40 is also connected to the input-output interface 35 in compliance with requirements, and a magnetic disk 51, an optical disk 52, a magneto-optical disk 53, or a semiconductor memory 54 is employed as required. When necessary, a computer program read out therefrom is installed in the storage 38.

FIG. 3 shows a structural example of the broadcast receiver/recorder 3. (When the broadcast receivers/recorders 3-1 and 3-2 need not be distinguished individually, hereinafter each will be referred to simply as broadcast receiver/recorder 3). A tuner 71 receives the electric waves including the broadcast program transmitted from the broadcaster 4, and outputs a base band signal to a demodulator 72. Then the demodulator 72 demodulates the output signal of the tuner 71, and sends the demodulated signal to a decoder 73. The decoder 73 decodes the input signal obtained from the demodulator 72, or a signal read out from a hard disk drive (HDD) 85 via a hard disk drive (HDD) controller 84 in conformity with the MPEG standard, for example, and then outputs a video signal to a composer 76 while outputting an audio signal to a mixer 74.

The composer 76 superposes, on the video signal input from the decoder 73, another video signal generated when necessary by a graphic controller 79, and supplied via a bus 78, and then sends the output video signal to a monitor 77 to thereby display the signal. Meanwhile the mixer 74 mixes the audio signal supplied from the decoder 73 with another audio signal when necessary, and then supplies the output audio signal to a speaker 75 to thereby emit the sound.

The CPU 80 executes various processes by controlling the component units of the broadcast receiver/recorder 3 via the bus 78. In the ROM 81, there are stored programs and parameters required for the CPU 80 to execute the various processes. In the PAM 82, programs and data required for the CPU 80 to execute the various processes are expanded. The input unit 86 is manipulated by the user and sends to the CPU 80 an output signal corresponding to the manipulation.

The network interface (I/F) 83 executes communications via the network 1. The hard disk drive controller 84 controls the hard disk drive 85 to record required data therein or to read out the recorded data therefrom.

Now an explanation will be given on the operation of the system shown in FIG. 1. When receiving any program transmitted from the broadcaster 4, the user of the broadcast receiver/recorder 3 instructs reception of the program of a predetermined channel by manipulating the input unit 86. In response to the instruction obtained from the input unit 86, the CPU 80 controls the tuner 71 so as to receive the electric waves of the program of the specified channel.

Upon reception of the electric waves of the specified channel, the tuner 71 outputs the received signal to the demodulator 72. Then the demodulator 72 demodulates the received signal, and outputs the demodulated signal to the decoder 73. The decoder 73 decodes the input signal and sends the decoded signal to the monitor 77 via the composer 76, thereby displaying the signal. Meanwhile the decoder 73 sends the audio signal to the speaker 75 via the mixer 74, thereby emitting the sound.

Thus, the user of the broadcast receiver/recorder 3 can view the program of any desired channel.

In case the user has instructed recording of the received program, the signal output from the decoder 73 is supplied to the hard disk drive 85 via the hard disk drive controller 84, so that the signal is recorded in the internal hard disk. This recording operation is executable even in a state where the video signal and the audio signal are not output to the monitor 77 or the speaker 75. In this case, "Broadcast platform ID", "Channel No." and "Broadcast start/end times" (which will be described later) of the program are also recorded simultaneously.

When reproduction of the program recorded in the hard disk has been instructed by a manipulation of the input unit 86, the CPU 80 controls the hard disk drive controller 84 to reproduce the specified program recorded in the hard disk of the hard disk drive 85. The reproduced signal is decoded by the decoder 73, and the video signal is output to the monitor 77 via the composer 76 so as to be displayed, while the audio signal is output to the speaker 75 via the mixer 74.

The user is thus able to view, at any desired time, the program recorded in the hard disk.

Further, the user is able to generate metadata for secondarily utilizing the broadcast program (broadcast content) recorded in the hard disk, and to record such metadata in the hard disk.

Suppose now that, as shown in FIG. 4A for example, there is recorded one program whose broadcast started at 19:00:00 on May 30, 2001 and ended at 20:00:00 on May 30, 2001. In this case, the user is able to edit any desired portions of such one-hour program by his or her own choice for secondary utilization. For example, as shown in FIG. 4B, the user selectively extracts, out of the one-hour program shown in FIG. 4A, "Top news" 111 from the position of 00:03:22 to the position of 00:04:35 at the relative time counted from the program start time, and also extracts "Economic news" 112 from 00:05:15 to 00:06:35 at the relative time. In this case, the CPU 80 generates metadata corresponding to the program, which is composed of these extracted portions 111 and 112. FIG. 5 shows an example of such metadata thus generated in this case.

In the example of FIG. 5, the target program is specified by block 201, wherein <Area id="Tokyo"> signifies that the broadcast area of this program is Tokyo; <Channel network="Terrestrial">4</Channel> signifies that the broadcast program is on Channel 4 of the terrestrial broadcast platform; <StartTime> signifies that the broadcast start time of this program is 19:00:00 on May 30, 2001, and <EndTime> signifies that the broadcast end time of this program is 20:00:00 on May 30, 2001.

The next block 202 of marker data contains an index indicating a destination of a jump in scanning. In this example, the position of 00:05:15 at the relative time is specified as an index. The description of this index is "Economic news". It is possible to specify a plurality of indexes.

Block 203 of story data prescribes two segments of seq=1 and seq=2.

The start time of the segment seq=1 is 00:03:22 at the relative time, and the end time thereof is 00:04:35 at the relative time. Its description is "Top news".

The start time of the segment seq=2 is 00:05:15 at the relative time, and the end time thereof is 00:06:35 at the relative time. Its description is "Economic news".

During execution of a reproduction mode in the broadcast receiver/recorder 3 according to the metadata mentioned above, if a scan is instructed for example, the operation jumps to the next index position, and then the normal reproduction is executed from that position. In case a reproduction of the story is designated, the ranges of the segments each prescribed by the start and end points thereof are reproduced sequentially.

Figure 6:
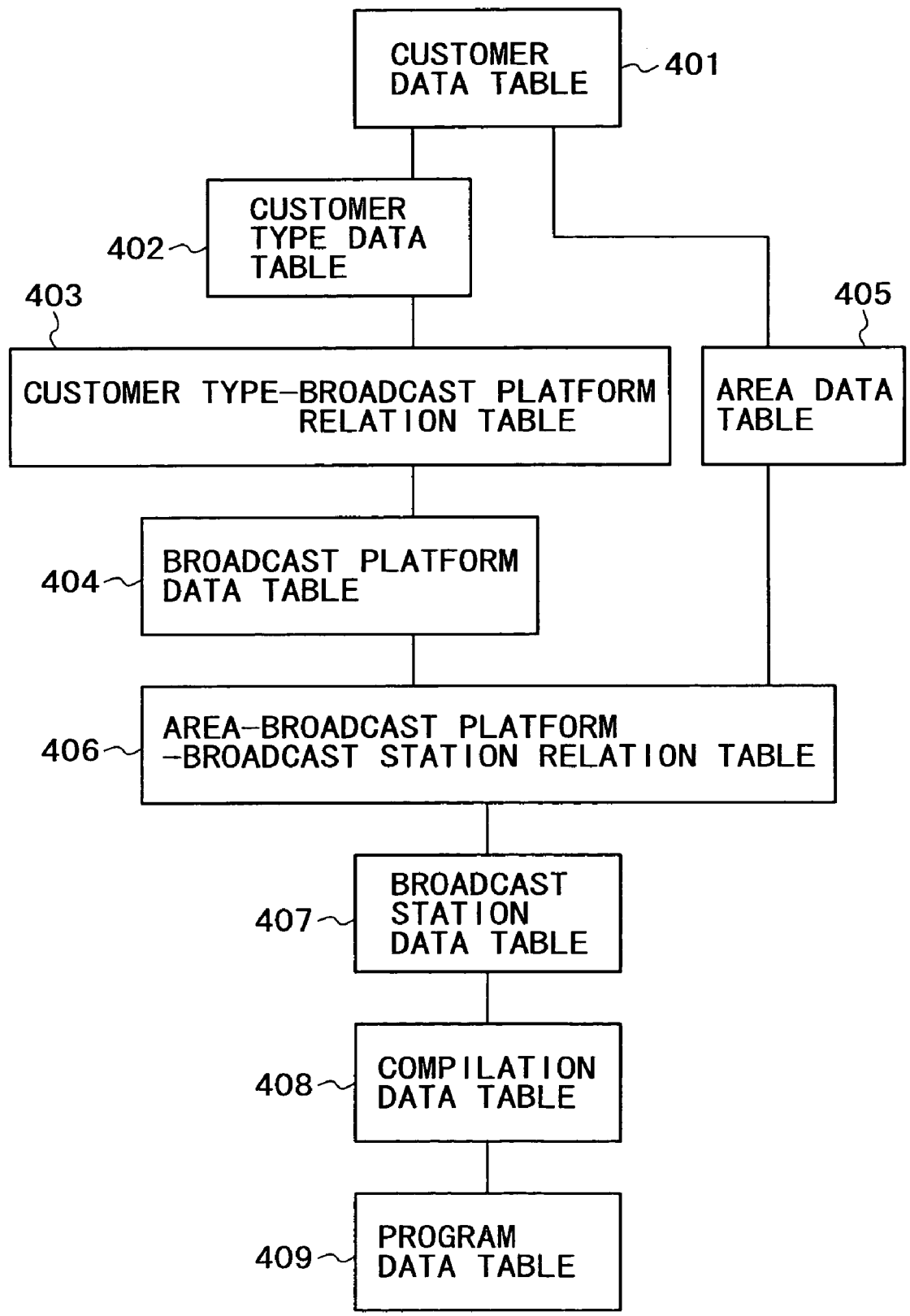
FIG. 6 is a diagram showing the structure of a database in the server of FIG. 1.

Referring now to FIG. 6, an explanation will be given on the structures of the customer database 11 and the program database 12 in the server 2. The data in the customer database 11 and the program database 12 is composed of a customer data table 401, a customer type data table 402, a customer type and broadcast platform relation table 403, a broadcast platform data table 404, an area data table 405, an area, broadcast platform, and broadcast station relation table 406, a broadcast station data table 407, a compilation data table 408, and a program data table 409. Out of these tables, the first three are held in the customer database 11, and the rest are held in the program database 12. However, such division may be arbitrary.

The customer data table 401 is a table for managing the customer data registered in the data providing system. In an example shown in FIG. 7, a user having a customer ID "1" is classified with an area "Tokyo", a customer type ID "1", a user name "xxx", and a password "yyy". The customer type ID denotes the type of broadcast platforms that can be viewed by the customer, and this ID is prescribed by the customer type data table 402 to be described below.

The customer type data table 402 is a table for managing the customer type ID. In an example shown in FIG. 8, a customer type ID "1" signifies that the user has a broadcast receiver/recorder 3 with a broadcast platform for "Terrestrial only". Similarly, a customer type ID "2" signifies that the user has a broadcast receiver/recorder 3 with a broadcast platform for "Terrestrial and BS-analog". Further, a customer type ID "3" signifies that the user has a broadcast receiver/recorder 3 with a broadcast platform for "Terrestrial, BS-analog, BS-digital, and CS".

Figure 10:
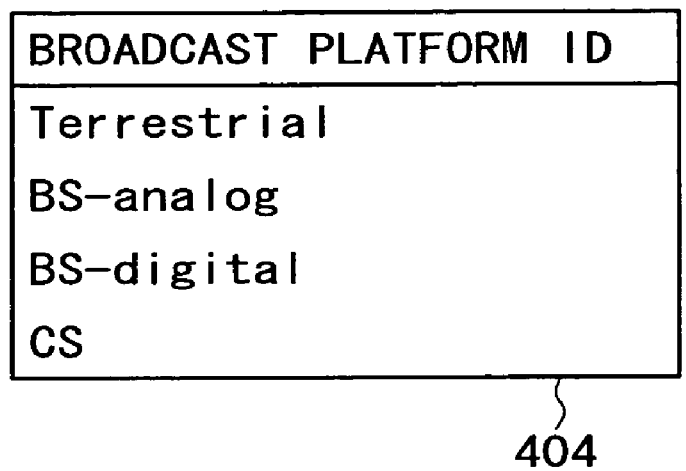
FIG. 10 is a diagram showing a broadcast platform data table of the database in the server of FIG. 6.

As shown in FIG. 9, the customer type and broadcast platform relation table 403 indicates the relationship between the customer type data table 402 (FIG. 8) and the broadcast platform data table 404 (FIG. 10 to be mentioned later). As shown in FIG. 8, the customer type ID "1" signifies that the user's broadcast receiver/recorder 3 is capable of receiving only "Terrestrial", and therefore it is related only to the broadcast platform ID "Terrestrial". In contrast therewith, the customer type ID "2" signifies that the user's broadcast receiver/recorder 3 is capable of receiving both "Terrestrial" and "BS-analog", and therefore it is related to the broadcast platform ID "Terrestrial and BS-analog". Further, the customer type ID "3" signifies that the user's broadcast receiver/recorder 3 is capable of receiving a total of four, i.e., "Terrestrial", "BS-analog", "BS-digital" and "CS", and therefore it is related to the broadcast platform ID "Terrestrial, BS-analog, BS-digital, and CS".

The broadcast platform data table 404 manages the broadcast platform ID to which this data providing system conforms. As shown in FIG. 10, the broadcast platform ID is composed of "Terrestrial", "BS-analog", "BS-digital", and "CS".

In the case of this example, the broadcast platform is composed of terrestrial, BS analog, BS digital, and CS. However, next-generation broadcast platforms represented by terrestrial digital broadcast may be employed as well.

Figure 11:
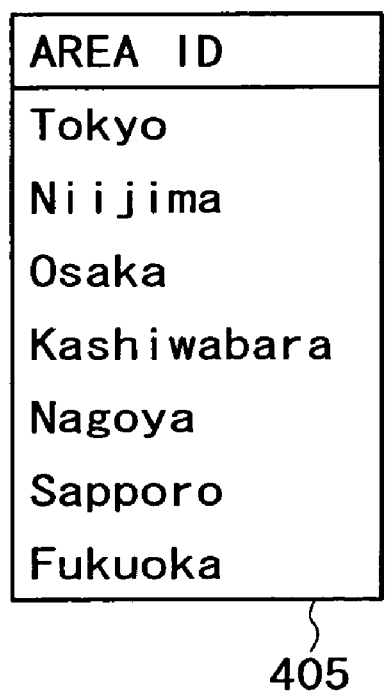
FIG. 11 is a diagram showing an area data table of the database in the server of FIG. 6.

The area data table 405 manages the area ID to which this data providing system conforms. In this example, as shown in FIG. 11, the area ID is composed of "Tokyo", "Niijima", . . . and "Fukuoka". The area ID is input by the user at the start of using the broadcast receiver/recorder 3, and then is recorded in the hard disk contained in the hard disk drive 85.

As shown in FIG. 12, the area, broadcast platform, and broadcast station relation table 406 indicates the relationship among the area data table 405 (FIG. 11), the broadcast platform data table 404 (FIG. 10), and the broadcast station data table 407 (FIG. 13 to be mentioned later). In this example, a broadcast corresponding to the broadcast platform ID "Terrestrial" and the broadcast station ID "JOAK", for instance, is set to channel No. "1" in the case of area ID "Tokyo", or is set to channel No. "52" in the case of area ID "Niijima". Thus, if the broadcast area ID is different, any program being broadcast from the other station having the same station ID is managed with a different channel number.

The broadcast station data table 407 manages the broadcast station ID to which this data providing system conforms. In this example, as shown in FIG. 13, broadcast station ID "JOAK" denotes a station name of "NHK general (Tokyo)" (service mark); and broadcast station ID "JOBK" denotes a station name of "NHK general (Osaka)" (service mark)

As shown in FIG. 14, the compilation data table 408 is a table for managing the stations, which broadcast the programs (mentioned below in connection with program data table 409 of FIG. 15) managed by this data providing system, and also for managing the broadcast start/end times thereof. For example, a program compilation with compilation ID "1" indicates that a program with program ID "1" is broadcast by the station with the ID "JOAK" during the period from a start time "984996000000" to an end time "984997800000". Also, a program compilation with compilation ID "2" indicates that a program with program ID "1" is broadcast by the station with the ID "JOBK" during the period from a start time "984996000000" to an end time "984997800000". Thus, in case the broadcast station is different, any program having the same program ID is managed with a different compilation ID.

The program data table 409 is a table for managing the programs managed by this data providing system. In this example, as shown in FIG. 15, the program with program ID "1" is so managed as to be classified by a title of "Today's news", an explanation of "Resignation of Cabinet", and a genre of "News". In the example of FIG. 15, the metadata or supplementary information (info1.xml, info2.xml, . . . ) corresponding to each program ID is also recorded.

As described above, the data of the customer database 11 and the program database 12 in the server 2 of this data providing system are managed individually and separately according to the data tables (customer data table 401, customer type data table 402, broadcast platform data table 404, area data table 405, broadcast station data table 407, compilation data table 408, and program data table 409). Further, such data are correlated and managed according to the relation tables (customer type and broadcast platform relation table 403, and area, broadcast platform, and broadcast station relation table 406).

Figure 16:
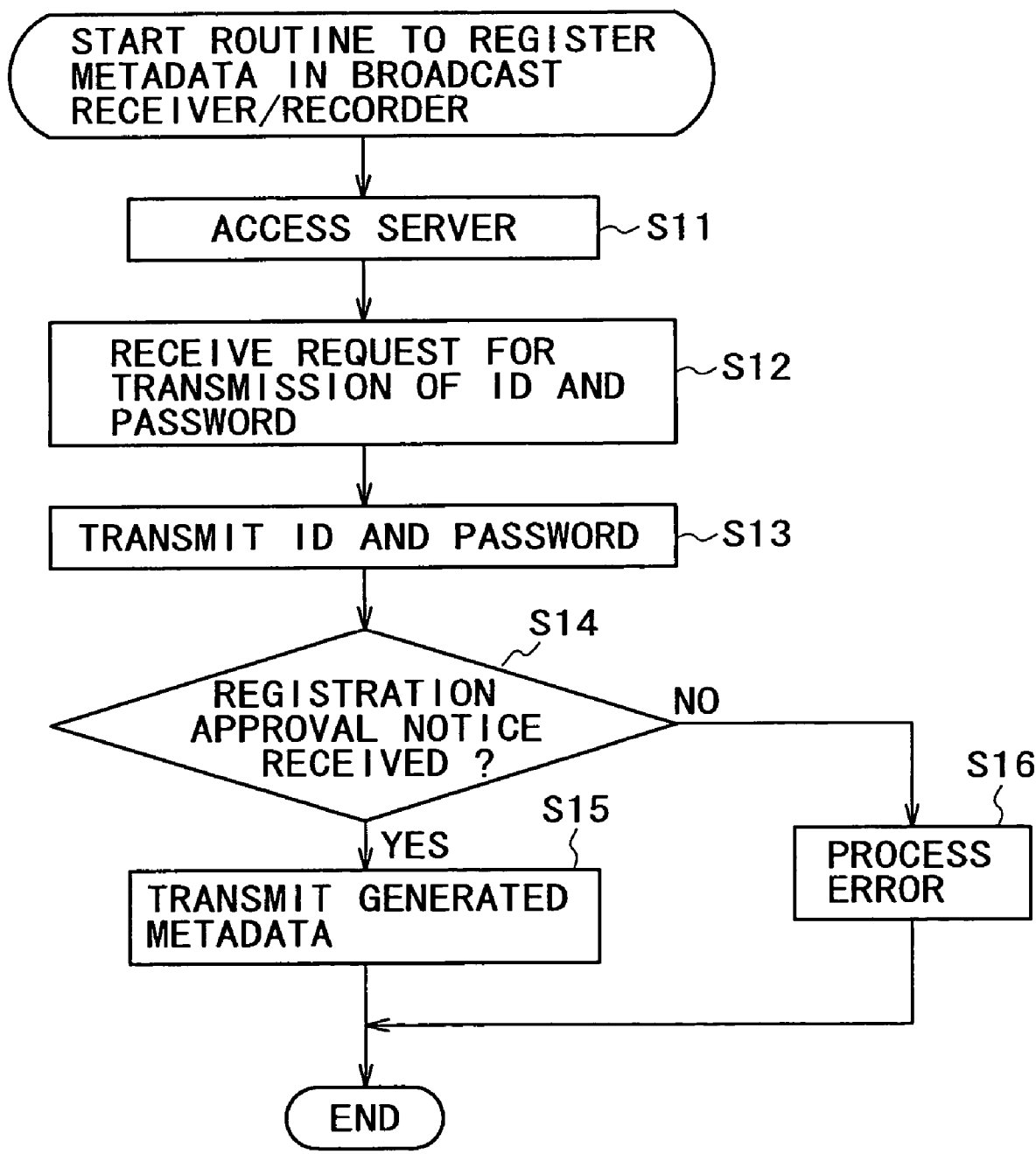
FIG. 16 is a flowchart for explaining a processing routine to register the additional data in the broadcast receiver/recorder of FIG. 1.
Figure 17:
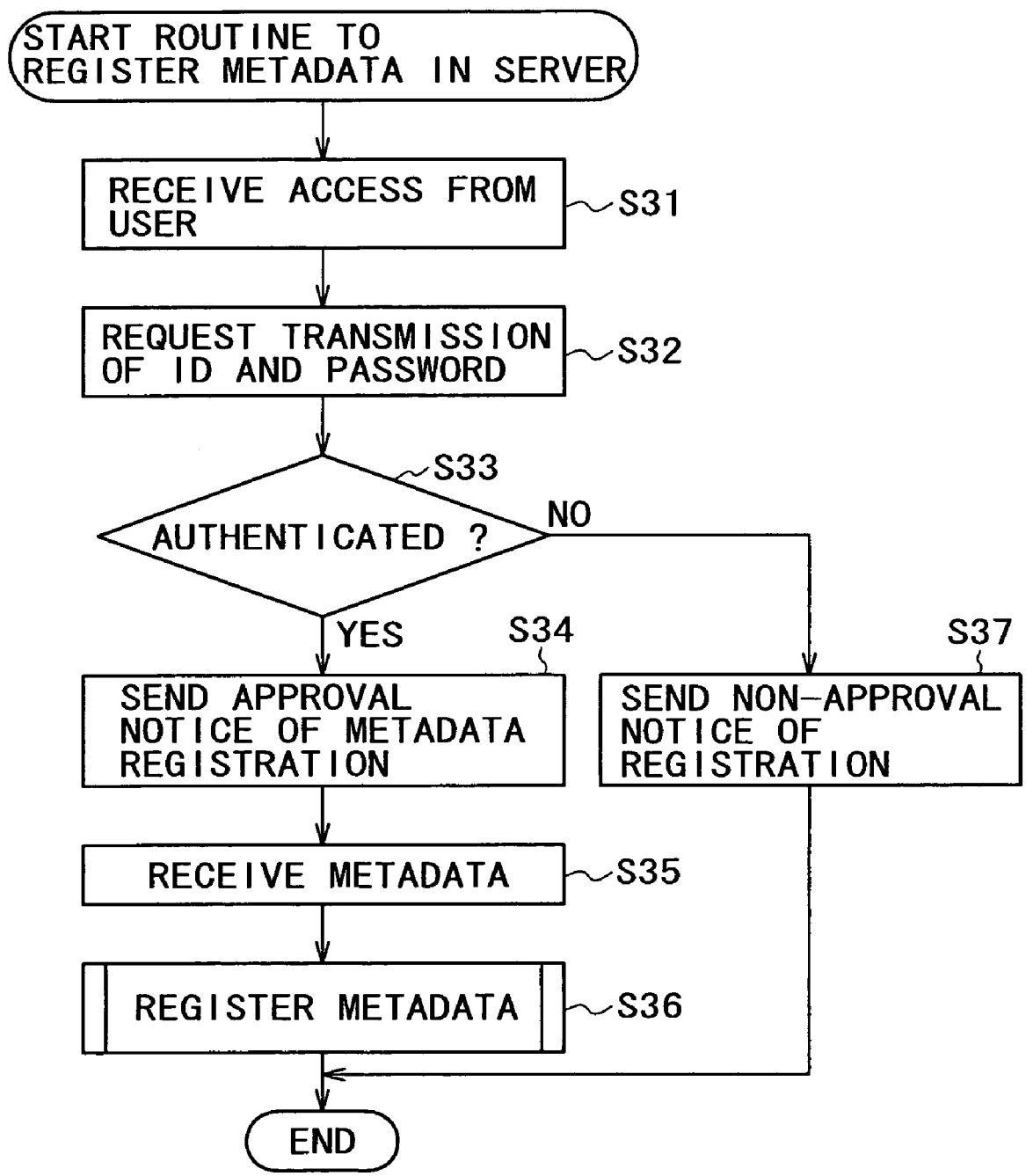
FIG. 17 is a flowchart for explaining a processing routine to register the additional data in the server of FIG. 1.

Supposing now that the user of the broadcast receiver/recorder 3-1 has generated the metadata or supplementary information shown in FIG. 5 and wants to provide such metadata to some other user. The user of the broadcast receiver/recorder 3-1 transmits the generated metadata to the server 2 so as to register the metadata therein. The processing routines to be executed in this case will be explained below with reference to the flowcharts of FIGS. 16 to 19. FIG. 16 shows a routine executed in the broadcast receiver/recorder 3-1, and FIG. 17 shows a routine executed in the server 2 in correspondence with the routine in the broadcast receiver/recorder 3-1. Hereinafter, the operation of the broadcast receiver/recorder 3-1 and that of the server 2 will be explained individually, but the relationship therebetween will be rendered obvious by referring to the flowchart of FIG. 18. Further, FIG. 19 shows the details of the operation performed to register the metadata in the server 2.

When transmitting the generated metadata to the server 2, the user of the broadcast receiver/recorder 3-1 manipulates the input unit 86 to command the CPU 80 to access the server 2. In response to an input command, the CPU 80 controls the network interface 83 at step S11, and enables the same to access the server 2 via the network 1. Upon such access, the server 2 sends a request for transmission of an ID and a password (step S32 in FIGS. 17 and 18).

At step S12, when the CPU 80 of the broadcast receiver/recorder 3 has received the request for transmission of an ID and a password from the server 2 via the network interface 83, the CPU 80 generates, in a graphics controller 79, a screen to request input of an ID and a password, and enables the monitor 77 to display the screen thereon via the composer 76. Then the user manipulates the input unit 86 in accordance with the displayed screen, and inputs the ID and the password assigned previously to the user from the server 2. At step S13, the CPU 80 transmits the ID and the password, which have been input from the user via the input unit 86, to the server 2 via the network interface 83.

Figure 18:
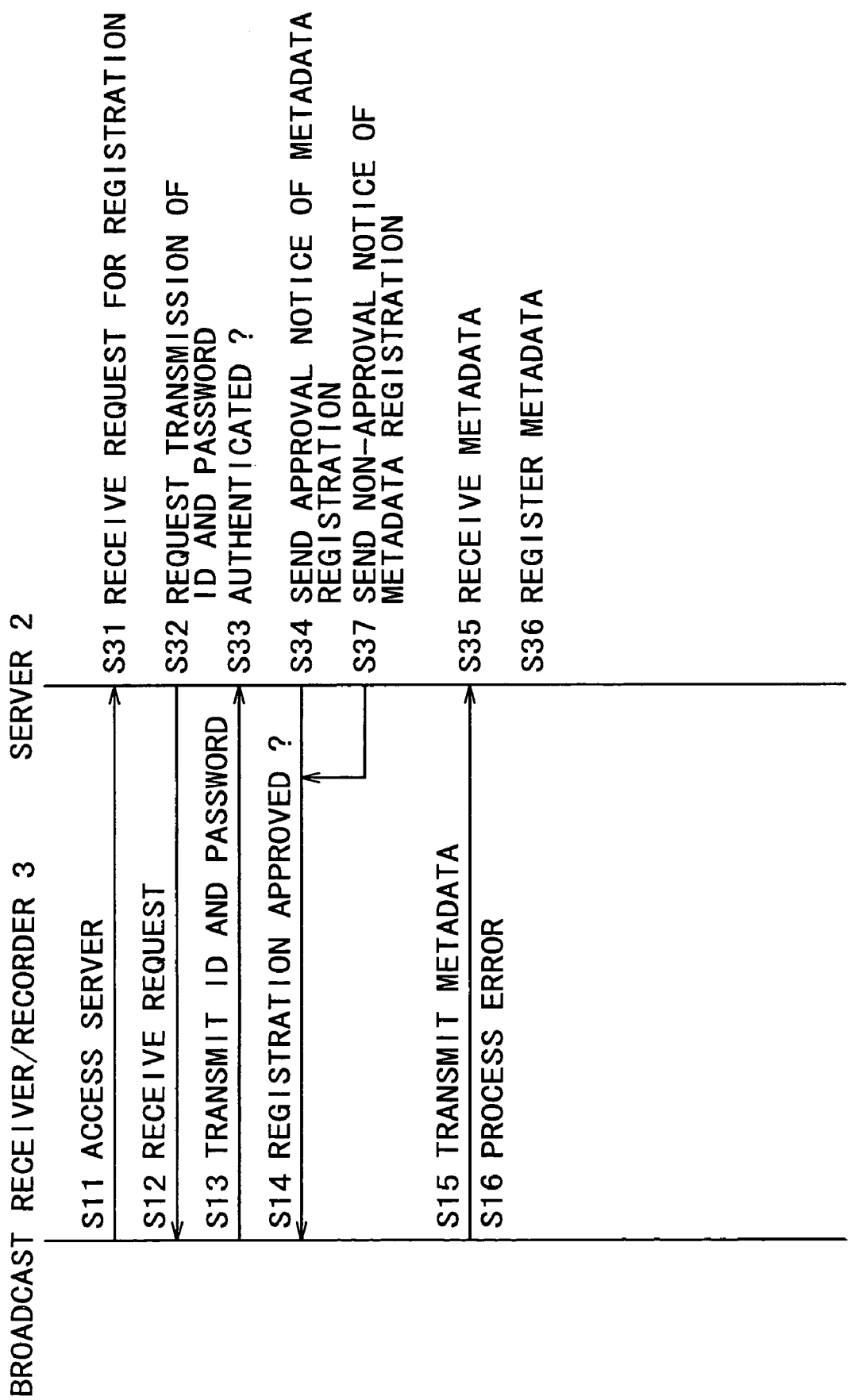
FIG. 18 is a diagram for explaining the relationship between the processing routines of FIGS. 16 and 17.
Figure 19:
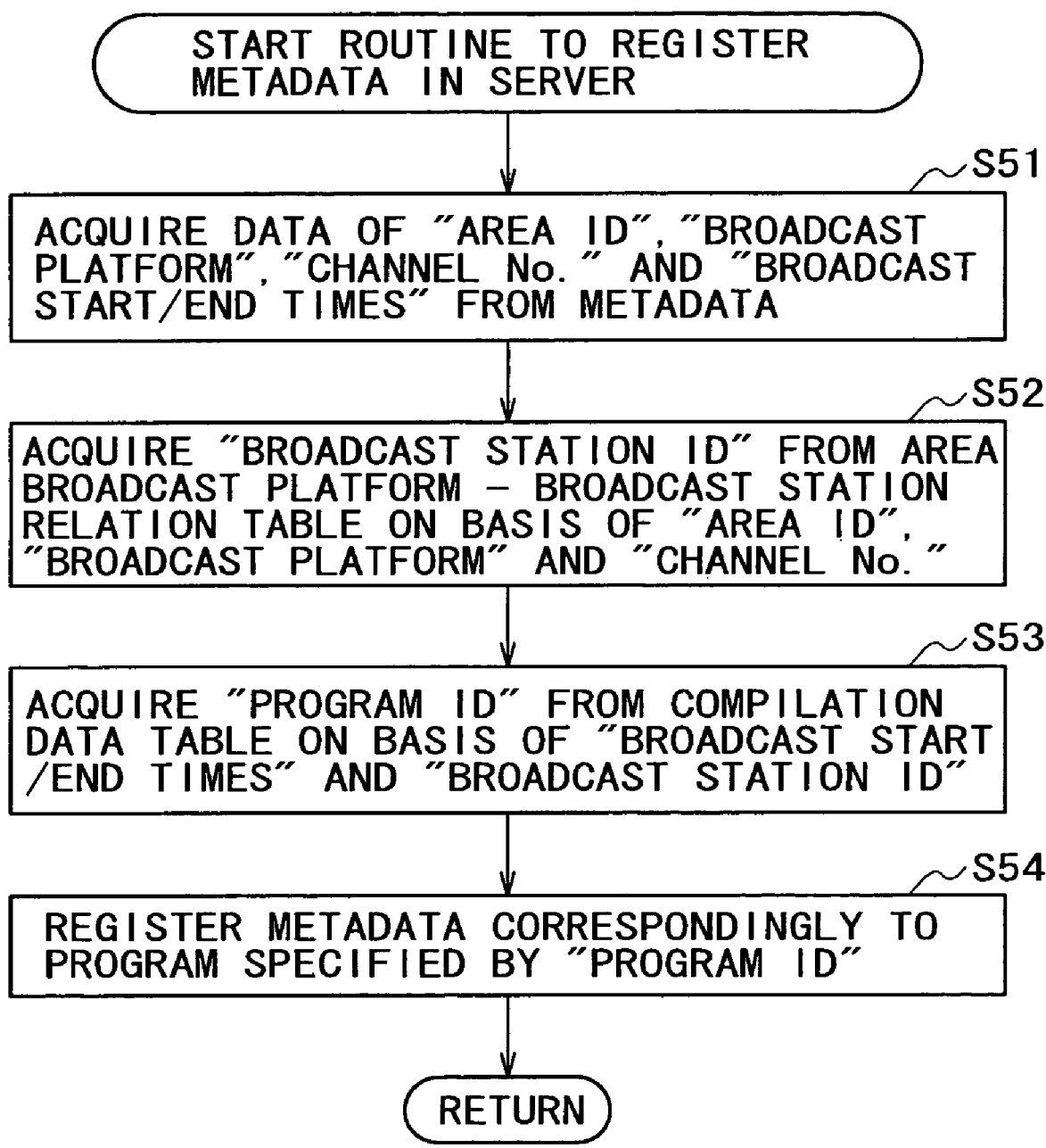
FIG. 19 is a flowchart for explaining the details of the processing routine to register the additional data in the server of FIG. 17.

The server 2 executes an authentication on the basis of the received ID and password and, in the case of acceptance, sends a notice of approval for registration of the metadata (step S34 in FIGS. 17 and 18). Meanwhile, in the case of non-acceptance, the server 2 sends a notice of non-approval for registration (step S37 in FIGS. 17 and 18).

At step S14, the CPU 80 of the broadcast receiver/recorder 3 makes a decision as to whether the notice of approval for registration has been received from the server 2. If the result of this decision signifies reception of the notice of approval for registration, the operation proceeds to step S15, where the generated metadata are read out from the hard disk drive 85, and then are sent to the server 2 via the network interface 83. The metadata thus sent are received by the server 2 (step S35 in FIGS. 17 and 18).

Meanwhile, if the result of the decision at step S14 signifies that the notice of approval for registration has not been received (i.e., when the notice of non-approval for registration has been received), the operation proceeds to step S16, where the CPU 80 executes a process of error. That is, since a correct authentication result has not been obtained in this case, the user is not approved to register the metadata in the server 2. Then the CPU 80 controls the graphics controller 79 to thereby generate an error message, and outputs this message from the composer 76 to the monitor 77 so as to display the message thereon. Accordingly, the user is notified that registration of the metadata is not executable.

On the other hand, in correspondence to such operation of the broadcast receiver/recorder 3, the CPU 31 of the server 2 executes the processing routine shown in the flowchart of FIG. 17.

At step S31, the CPU 31 receives an access from the broadcast receiver/recorder 3 via the communicator 39. Then at step S32, the CPU 31 reads out, from the storage 38, the message screen, which requests transmission of the ID and the password, and sends the request from the communicator 39 to the broadcast receiver/recorder 3-1 via the network 1.

In response to this request, as described, the ID and the password are transmitted from the broadcast receiver/recorder 3-1 (step S13 in FIGS. 16 and 18). Then at step S33, the CPU 31 receives the ID and the password from the broadcast receiver/recorder 3-1 via the communicator 39, and compares the received ID and password with those of the user stored in the customer database 11 of the storage 38. When the result of such comparison indicates a coincidence therebetween, it signifies that an authentication has been attained, and the operation proceeds to step S34, where the CPU 31 generates a message or notice to approve registration of the metadata, and transmits the message to the broadcast receiver/recorder 3-1 via the communicator 39.

The metadata are transmitted from the broadcast receiver/recorder 3 (step S15 in FIGS. 16 and 18) in response to the notice of approval for registration of the metadata, so that at step S35, the CPU 31 receives the metadata via the communicator 39. Subsequently, at step S36, the CPU 31 supplies the received metadata to the program database 12 of the storage 38, and then executes a processing routine for registration. Now the routine for registering the metadata in the broadcast receiver/recorder 3 will be explained below with reference to the flowchart of FIG. 19.

At step S51, the CPU 31 acquires, from the metadata received at step S35, the program-specifying data "Area ID", "Broadcast platform", "Channel No." and "Broadcast start/end times", which are included in the received metadata.

At step S52, the CPU 31 acquires "Broadcast station ID" from the area, broadcast platform, and broadcast station relation table 406 (FIG. 12) on the basis of "Area ID", "Broadcast platform", and "Channel No.".

At step S53, the CPU 31 acquires "Program ID" from the compilation data table 408 (FIG. 14) on the basis of "Broadcast start/end times" obtained at step S51 and "Broadcast station ID" obtained at step S52.

At step S54, the CPU 31 supplies the metadata, which have been received from the broadcast receiver/recorder 3 in accordance with the program specified by "Program ID" obtained at step S53, to the program database 12 of the storage 38, and registers such metadata therein. The metadata thus registered are managed in the program data table 409 (FIG. 15) of the program database 12.

Meanwhile, in case the ID and the password transmitted from the broadcast receiver/recorder 3-1 fail to coincide with the ID and the password registered previously in the customer database 11, the CPU 31 makes a decision of no authentication at step S33 in FIG. 17. Then the operation proceeds to step S37, where the CPU 31 generates a message or notice of non-approval for registration, and transmits the message from the communicator 39 to the broadcast receiver/recorder 3-1.

As mentioned above, the metadata generated by the users of many broadcast receivers/recorders 3 are transmitted to and registered in the program database 12 of the server 2. It is a matter of course that the metadata generated by the metadata generator 5 are also registered. Therefore, each user utilizing this system can enjoy the program (broadcast content), which is held by the user utilizing this system, on the basis of the metadata generated by the other users.

Figure 20:
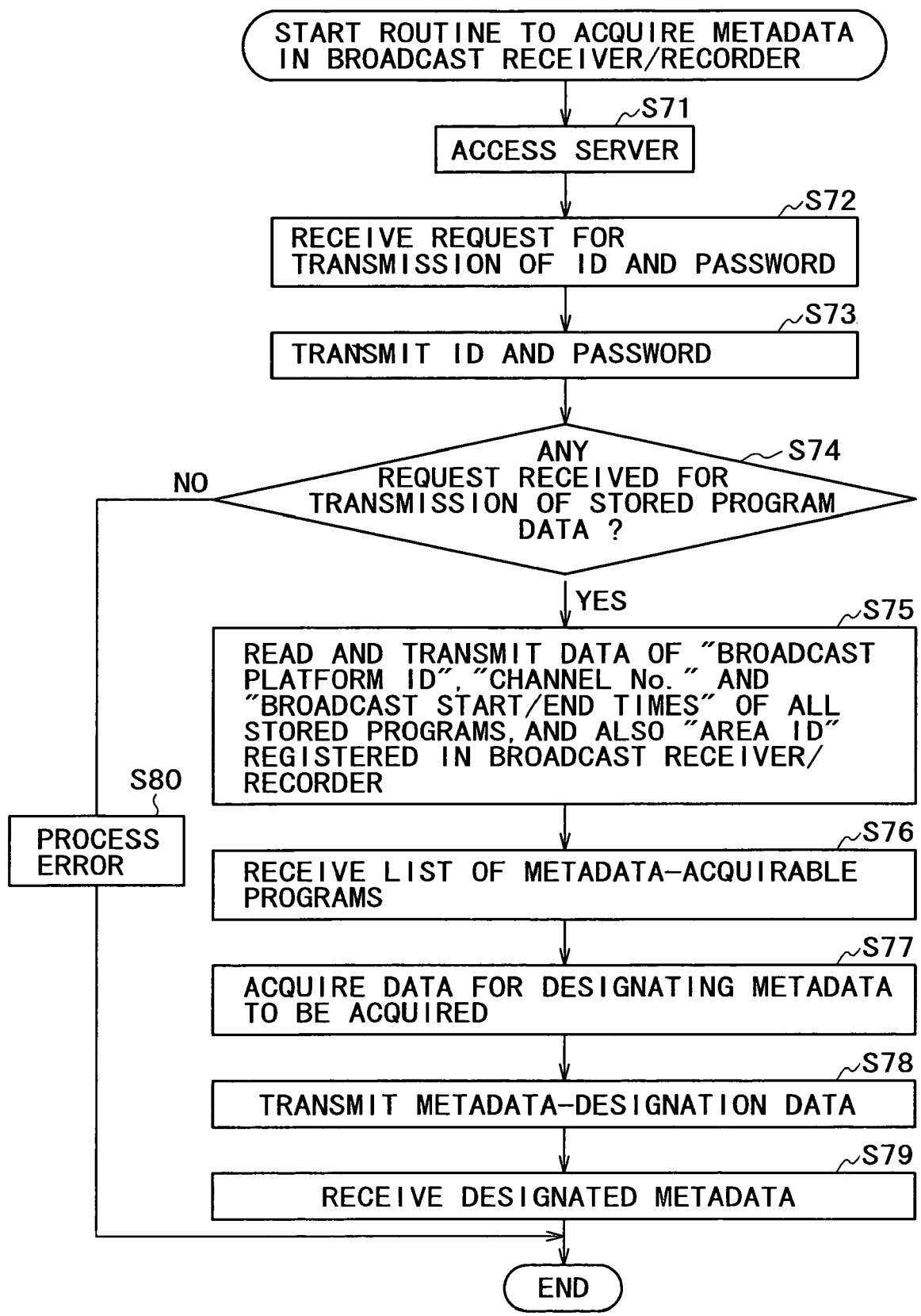
FIG. 20 is a flowchart for explaining a processing routine to acquire the metadata in the broadcast receiver/recorder of FIG. 1.

For this purpose, the user of the broadcast receiver/recorder 3-2, for example, accesses the server 2 and executes a processing routine to obtain the metadata generated by the other users and registered in the server 2, so as to enjoy the program (broadcast content), which is held by the user of the broadcast receiver/recorder 3-2, on the basis of the metadata generated by the other users. Next, this processing routine will be explained below with reference to the flowcharts of FIGS. 20 to 22. FIG. 20 shows a processing routine executed in the broadcast receiver/recorder 3-2, and FIG. 21 shows a routine executed in the server 2 in correspondence therewith. Hereinafter the operation of the broadcast receiver/recorder 3-2 and that of the server 2 will be explained individually, but the relationship therebetween will be rendered obvious by referring to the flowchart of FIG. 22.

First, an explanation will be given on the operation of the broadcast receiver/recorder 3-2 with reference to the flowchart of FIG. 20. In response to an input command to access the server 2 received from the user via the input unit 86 at step S71, the CPU 80 controls the network interface 83 to access the server 2. Upon such access, the server 2 sends a request for transmission of an ID and a password (step S102 in FIGS. 21 and 22). Then at step S72, the CPU 80 receives the request for transmission of an ID and a password, and outputs the request to the monitor 77 so as to display the same thereon. Subsequently, the user of the broadcast receiver/recorder 3-2 manipulates the input unit 86 in accordance with the displayed request to thereby input the ID and the password assigned previously to the user. At step S73, the CPU 80 transmits the input ID and password to the server 2 via the network interface 83.

The server 2 executes an authentication on the basis of the received ID and password and, in the case of attaining a correct result of the authentication, sends a request for transmission of the stored program data (step S104 in FIGS. 21 and 22). Meanwhile, when a correct result of the authentication is not achieved, a request for transmission of the stored program data is not sent. At step S74, the CPU 80 makes a decision as to whether a request for transmission of the stored program data has been sent. If the result of this decision signifies that a request for transmission of the stored program data has not been sent, the operation proceeds to step S80, where the CPU 80 executes an error process. That is, since a correct result of the authentication has not been attained in this case, the user of the broadcast receiver/recorder 3-2 is not approved to acquire the metadata.

In case the result of the decision at step S74 signifies that the request for transmission of the recorded program data has been sent, the operation proceeds to step S75, where the CPU 80 reads out "Area ID" registered in the broadcast receiver/recorder 3-2, and also "Broadcast platform ID", "Channel No.", and "Broadcast start/end times" of all of the programs stored in the hard disk drive 85, and transmits the read data to the server 2 via the network interface 83. Consequently, the server 2 is able to acquire the data of the broadcast programs stored in the hard disk drive 85 of the broadcast receiver/recorder 3-2.

Upon reception of all of the stored program data ("Area ID", "Broadcast platform ID", "Channel No.", and "Broadcast start/end times"), the server 2 retrieves the metadata corresponding to the received program data, and transmits a list thereof (step S108 in FIGS. 21 and 22). Subsequently at step S76, the CPU 80 receives the list of the programs for which metadata may be acquired via the network interface 83, and then outputs the list to the monitor 77 so as to display the same thereon. While viewing the displayed list, the user manipulates the input unit 86 to select the metadata of a desired program from the list. When the metadata of the desired program have been designated by the user, the CPU 80 acquires, at step S77, the metadata designation data (to specify the metadata) of the program to be acquired. At step S78, the CPU 80 transmits the designation data to the server 2 via the network interface 83.

Upon reception of the metadata designation data of the desired program, the server 2 transmits the corresponding metadata (step S115 in FIGS. 21 and 22). Then at step S79, the CPU 80 receives the metadata from the server 2 and supplies the metadata to the hard disk drive 85 so as to record the same.

Referring next to the flowchart of FIG. 21, an explanation will be given on the processing routine executed in the server 2 in correspondence with the routine in the broadcast recorder/receiver 3-2.

At step S101, the CPU 31 receives a metadata acquisition request from the user of the broadcast receiver/recorder 3-2. Then at step S102, the CPU 31 requests the broadcast receiver/recorder 3-2 to transmit an ID and a password. In response to this request, the broadcast receiver/recorder 3-2 transmits the ID and the password (step S73 in FIGS. 20 and 22) as mentioned.

Subsequently at step S103, the CPU 31 receives the ID and the password from the broadcast receiver/recorder 3-2 via the communicator 39, and makes a decision as to whether the received ID and password coincide with those registered previously in the customer database 11, thereby authenticating the user. If a correct result of the authentication is not obtained, the user is not regarded as a proper user to receive the metadata distribution service, and the processing routine is ended here.

Meanwhile, if a correct result of the authentication is obtained, the operation proceeds to step S104, where the CPU 31 requests the broadcast receiver/recorder 3-2 to transmit all of the program data stored therein. Then, in response to this request, the broadcast receiver/recorder 3-2 reads out and transmits the program data ("Area ID", "Broadcast platform ID", "Channel No.", and "Broadcast start/end times") stored in the hard disk drive 85 (step S75 in FIGS. 20 and 22).

Thereafter at step S105, the CPU 31 receives the stored program data. At step S106, the CPU 31 specifies the "Broadcast ID" of each program from the area, broadcast platform, and broadcast station relation table 406 (FIG. 12) of the program database 12 on the basis of the received "Area ID", "Broadcast platform ID", and "Channel No.".

Subsequently at step S107, the CPU 31 specifies the "Program ID" of each program from the compilation data table 408 (FIG. 14) of the program database 12 on the basis of the received "Broadcast start/end times".

Next at step S108, the CPU 31 reads out the metadata of the programs for which metadata may be acquired from the program data table 409 (FIG. 15) of the program database 12 on the basis of the "Program ID" specified at step S107, and transmits a list of such metadata to the broadcast receiver/recorder 3-2.

When the list of the metadata has thus been transmitted, designation data for designating at least one of such metadata is transmitted from the broadcast receiver/recorder 3-2 (step S78 in FIGS. 20 and 22). Then the CPU 31 receives, at step S109, the metadata designation data transmitted from the broadcast receiver/recorder 3-2, and acquires, at step S110, "Metadata" of the relevant program from the program data table 409 (FIG. 15) of the program database 12.

Thereafter at step S111, the CPU 31 acquires "Broadcast station ID" and "Broadcast start/end times" of the relevant program from the compilation data table 408 (FIG. 14) of the program database 12 on the basis of the received "Program ID". Then at step S112, the CPU 31 acquires "Area ID" and "Customer type ID" of the user of the broadcast receiver/recorder 3-2 from the customer data table 401 (FIG. 7) of the customer database 11. Subsequently at step S113, the CPU 31 acquires "Broadcast platform ID" from the customer type and broadcast platform relation table 403 (FIG. 9) on the basis of the acquired "Customer type ID".

Further at step S114, the CPU 31 acquires "Channel No." from the area, broadcast platform, and broadcast station relation table 406 (FIG. 12) on the basis of "Broadcast station ID" obtained by the process at step S111, "Area ID" obtained by the process at step S112, and "Broadcast platform ID" obtained by the process at step S113.

At step S115, the CPU 31 adds the data of "Area ID", "Broadcast platform ID", "Channel No.", and "Broadcast start/end times", which have been obtained by the preceding processes, to the metadata obtained by the process at step S110 (i.e., the CPU 31 rewrites the former metadata block 201 [FIG. 5]), and transmits the update metadata to the broadcast receiver/recorder 3-2.

Thus, in compliance with the user of the broadcast receiver/recorder 3-2, the server 2 rewrites and distributes the metadata block 201 (FIG. 5) thereto, whereby the user of the broadcast receiver/recorder 3-2 is able to enjoy the recorded program (broadcast content) by utilizing the metadata registered by the user of the broadcast receiver/recorder 3-1 who lives in some other area (of a different broadcast station).

As described above, the data of the broadcast programs are managed independently of the broadcast station data and the time slot data in the program database 12 of the server 2, so that even when the same broadcast program is being broadcast from mutually different stations, it is possible to accurately specify the program (broadcast content) whose metadata are required by the user.

Further, the broadcast station data are also managed independently of the area data, the broadcast platform data, and the channel data, so that the program can be specified accurately even when the same program is being broadcast at mutually different frequencies in different areas.

The series of processing routines mentioned above can be executed by software as well as by hardware. In the case of executing such series of processing routines by means of software, the programs constituting the software are installed from a program storage medium into a computer incorporated in exclusive software, or are installed into, e.g., a general-purpose personal computer, which is capable of executing various functions in accordance with various programs installed therein.

As shown in FIG. 2, the program storage medium, which contains the programs to be installed into a computer in a state executable by the computer, may include a package media, a ROM 32 where the programs are stored temporarily or permanently, and a storage 38. The package media is composed of a magnetic disk 51 (including a flexible disk), an optical disk 52 (including a CD-ROM [Compact Disc-Read Only Memory] and a DVD [Digital Versatile Disc]), a magneto-optical disk 53 (including an MD (Mini Disc, trade name)), or a semiconductor memory 54.

In this specification, the steps that describe the program stored in the recording medium may be executed in time series in accordance with the mentioned sequence, or may be executed in parallel or individually without being restricted to the time series processing.

The term "system" in this specification represents the whole combination including a plurality of apparatus.

As described hereinabove, according to the first invention, the first data processor transmits metadata related to broadcast programs to the second data processor via the network; the second data processor acquires from the transmitted metadata data for each of the broadcast programs specifying the broadcast station of the broadcast program and time data related to the broadcast program, then retrieves a program ID for identifying the broadcast program based on the data specifying the broadcast station and the time data, and registers the metadata related to the broadcast program in relation to the retrieved program ID; and the third data processor transmits selected data to the second data processor via the network, the selected data including data for specifying the broadcast station of a broadcast program received and recorded in the third data processor and time data related to the received and recorded broadcast program. The second data processor then specifies the program ID of the received and recorded broadcast program based on the selected data, converts the metadata corresponding to the specified program ID based on the selected data, and transmits the converted metadata to the third data processor via the network. The third data processor receives the converted metadata from the second data processor via the network, hence realizing a system that is capable of distributing the metadata generated in a predetermined area to a different area to thereby achieve effective utilization of the metadata.

According to the second invention, the metadata related to broadcast programs and transmitted from the first other data processor are received, data for each of the broadcast programs is acquired from the received metadata, the data specifying a broadcast station of the broadcast program and time data related to the broadcast program, the program ID for identifying the broadcast program is retrieved based on the data specifying the broadcast station and the time data, and the metadata related to the broadcast program is registered in relation to the received program ID, so that it becomes possible to provide the metadata generated in a predetermined area to a different area.

The invention claimed is:

1. A data providing system, comprising:
   first, second and third data processors connected to a network;
   said first data processor being operable to transmit metadata related to broadcast programs to said second data processor via said network;
   said second data processor being operable to acquire from the transmitted metadata data for each of the broadcast programs specifying a broadcast station of the broadcast program and time data related to the broadcast program, to retrieve a program ID for identifying the broadcast program based on the data specifying the broadcast station and the time data, and to register the metadata related to the broadcast program in relation to the retrieved program ID;
   said third data processor being operable to transmit selected data to said second data processor via said network, the selected data including data for specifying the broadcast station of a broadcast program received and recorded in said third data processor and time data related to the received and recorded broadcast program;
   said second data processor being further operable to specify the program ID of the received and recorded broadcast program based on the selected data, to convert the metadata corresponding to the specified program ID based on the selected data, and to transmit the converted metadata to said third data processor via said network; and
   said third data processor being further operable to receive the converted metadata from said second data processor via the network.

2. A data processing apparatus, comprising:
   receiving means for receiving metadata related to broadcast programs, the metadata being transmitted from a first other data processor via a network;
   acquiring means for acquiring from the received metadata data for each of the broadcast programs specifying a broadcast station of the broadcast program and time data related to the broadcast program;
   retrieval means for retrieving a program ID for identifying the broadcast program based on the data specifying the broadcast station and the time data;
   register means for registering the metadata related to the broadcast program in relation to the retrieved program ID;
   accepting means for accepting selected data from a second other data processor via the network, the selected data including data for specifying a broadcast station of a broadcast program received and recorded in the second other data processor and time data related to the received and recorded broadcast program;

specifying means for specifying the program ID of the received and recorded broadcast program based on the selected data;

conversion means for converting the metadata corresponding to the specified program ID based on the selected data; and transmitting means for transmitting the converted metadata to the second other data processor via the network.

3. A method for processing data in a data processing apparatus, comprising:

receiving metadata related to broadcast programs, the metadata being transmitted from a first other data processor via a network;

acquiring from the received metadata data for each of the broadcast programs specifying a broadcast station of the broadcast program and time data related to the broadcast program;

retrieving a program ID for identifying the broadcast program based on the data specifying the broadcast station and the time data;

registering the metadata related to the broadcast program in relation to the retrieved program ID;

accepting selected data from a second other data processor via the network, the selected data including data for specifying a broadcast station of a broadcast program received and recorded in the second other data processor and time data related to the received and recorded broadcast program;

specifying the program ID of the received and recorded broadcast program based on the selected data;

converting the metadata corresponding to the specified program ID based on the selected data; and transmitting the converted metadata to the second other data processor via the network.

4. A computer readable medium recorded with a computer-readable program for processing data, said program comprising:

receiving metadata related to broadcast programs, the metadata being transmitted from a first other data processor via a network;

acquiring from the received metadata data for each of the broadcast programs specifying a broadcast station of the broadcast program and time data related to the broadcast program;

retrieving a program ID for identifying the broadcast program based on the data specifying the broadcast station and the time data;

registering the metadata related to the broadcast program in relation to the retrieved program ID;

accepting selected data from a second other data processor via the network, the selected data including data for specifying a broadcast station of a broadcast program received and recorded in the second other data processor and time data related to the received and recorded broadcast program;

specifying the program ID of the received and recorded broadcast program based on the selected data;

converting the metadata corresponding to the specified program ID based on the selected data; and transmitting the converted metadata to the second other data processor via the network.

5. A system for processing data, said system comprising:

a processor operable to execute instructions; and instructions, the instructions including:

receiving metadata related to broadcast programs, the metadata being transmitted from a first other data processor via a network;

acquiring from the received metadata data for each of the broadcast programs specifying a broadcast station of the broadcast program and time data related to the broadcast program;

retrieving a program ID for identifying the broadcast program based on the data specifying the broadcast station and the time data;

registering the metadata related to the broadcast program in relation to the retrieved program ID;

accepting selected data from a second other data processor via the network, the selected data including data for specifying a broadcast station of a broadcast program received and recorded in the second other data processor and time data related to the received and recorded broadcast program;

specifying the program ID of the received and recorded broadcast program based on the selected data;

converting the metadata corresponding to the specified program ID based on the selected data; and transmitting the converted metadata to the second other data processor via the network.

* * * * *